United States Patent
Zhang

(10) Patent No.: US 10,540,320 B2
(45) Date of Patent: Jan. 21, 2020

(54) TEMPORARY FILE MANAGEMENT METHOD FOR OPERATING SYSTEM OR APPLICATIONS

(71) Applicant: Zhaoqi Zhang, Hunan (CN)

(72) Inventor: Zhaoqi Zhang, Hunan (CN)

( * ) Notice: Subject to any disclaimer, the term of this patent is extended or adjusted under 35 U.S.C. 154(b) by 219 days.

(21) Appl. No.: 15/739,708

(22) PCT Filed: Jun. 29, 2016

(86) PCT No.: PCT/CN2016/087638
§ 371 (c)(1),
(2) Date: Dec. 23, 2017

(87) PCT Pub. No.: WO2017/005125
PCT Pub. Date: Jan. 12, 2017

(65) Prior Publication Data
US 2018/0189302 A1  Jul. 5, 2018

(30) Foreign Application Priority Data

Jul. 6, 2015  (CN) .......................... 2015 1 0389664

(51) Int. Cl.
*G06F 16/30* (2019.01)
*G06F 16/11* (2019.01)
(Continued)

(52) U.S. Cl.
CPC .......... *G06F 16/125* (2019.01); *G06F 3/0608* (2013.01); *G06F 3/0619* (2013.01);
(Continued)

(58) Field of Classification Search
CPC ..... G06F 16/162; G06F 3/0608; G06F 3/0643
See application file for complete search history.

(56) References Cited

U.S. PATENT DOCUMENTS 7,295,230 B2 * 11/2007 Takahashi ............ H04N 1/2112
348/231.1
7,991,747 B1 * 8/2011 Upadhyay ............. G06F 11/004
707/674

(Continued)

FOREIGN PATENT DOCUMENTS

CN         1679004 A       10/2005
CN         103645914        3/2014

*Primary Examiner* — Mahesh H Dwivedi

(57) ABSTRACT

A temporary file management method for operating system or applications is disclosed, which comprises steps of creating a to-be-deleted-next-time-content directory beforehand and at least one not-to-be-deleted-next-time-content directory; saving temporary files in the to-be-deleted-next-time-content directory or the not-to-be-deleted-next-time-content directories when the operating systems or the applications is running; deleting the files in the to-be-deleted-next-time-content directory when a pre-set temporary file cleaning condition are triggered; specifying a not-to-be-deleted-next-time-content directory; switching and saving files in the specified not-to-be-deleted-next-time-content directory in the to-be-deleted-next-time-content directory. The present invention prevents the temporary files from occupying the storage space for a long time, which ensures the operating system runs with high efficiency, space saving and good user experience.

20 Claims, 1 Drawing Sheet

(51) Int. Cl.
*G06F 16/16* (2019.01)
*G06F 3/06* (2006.01)

(52) U.S. Cl.
CPC ......... *G06F 3/0643* (2013.01); *G06F 16/116* (2019.01); *G06F 16/162* (2019.01)

(56) References Cited

U.S. PATENT DOCUMENTS

| | | | | |
|---|---|---|---|---|
| 8,380,676 | B1* | 2/2013 | Eastham | G06F 16/125 707/662 |
| 8,560,709 | B1* | 10/2013 | Shokhor | H04L 63/20 709/203 |
| 10,084,844 | B2* | 9/2018 | Bartlett | G06F 16/122 |
| 2004/0267705 | A1* | 12/2004 | Lemus | G06F 16/10 |
| 2009/0070535 | A1* | 3/2009 | Adkins | G06F 16/128 711/162 |
| 2010/0306173 | A1* | 12/2010 | Frank | G06F 9/45558 707/640 |
| 2016/0350296 | A1* | 12/2016 | Li | G06F 9/5022 |
| 2018/0189082 | A1* | 7/2018 | Zhang | G06F 8/47 |

* cited by examiner

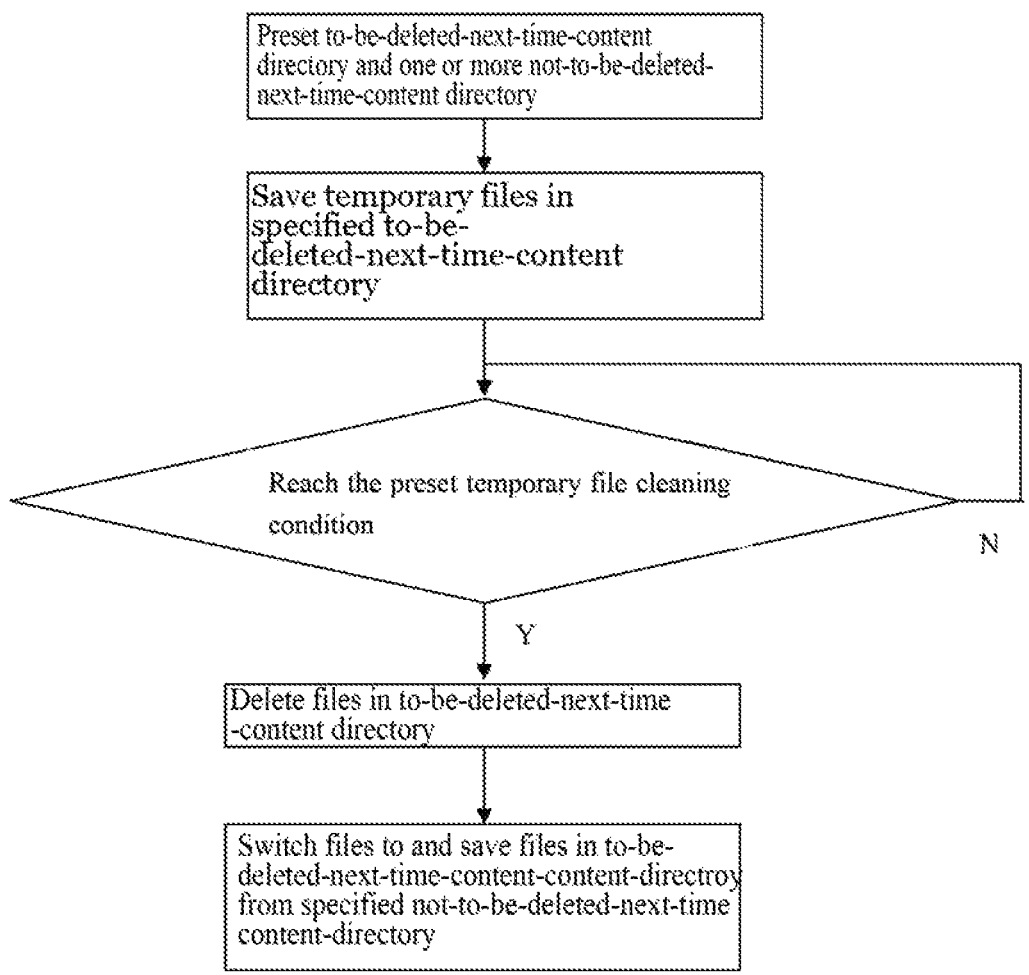

TEMPORARY FILE MANAGEMENT METHOD FOR OPERATING SYSTEM OR APPLICATIONS

CROSS REFERENCE OF RELATED APPLICATION

This is a U.S. National Stage under 35 U.S.C 371 of the International Application PCT/CN2016/087638, filed Jun. 29, 2016, which claims priority under 35 U.S.C. 119(a-d) to CN 201510389664.6, filed Jul. 6, 2015.

BACKGROUND OF THE PRESENT INVENTION

Field of Invention

The present invention relates to file management technology for computer operating system, and more particularly to a temporary file management method for operating systems and applications.

Description of Related Arts

Temporary files are used in the operating systems of computers and applications. A large amount of temporary files are not able to be deleted after use due to program abnormal exit, executive error, power off, computer crash, negligence of the programmer or other reasons. Conventionally, the number of the temporary files is increasing with the use of more and more applications and the temporary files occupy a large amount of releasable storage space. If the redundant files occupy too much space, the normal use of the operating systems or the applications is affected. Time and efforts are required to clean the temporary files. Even a re-installation of the system is necessary. Sometimes, the RAM is virtualized to a section in which the temporary files are saved. When the power is off, the files saved in the RAM are lost due to the characteristic of the RAM. The RAM is too precious for saving temporary files. The temporary files which are used after the restart are not able to be saved in the RAM. Meanwhile, to clean the temporary files by exiting or re-starting the system may cause irretrievable lost because the user loses chances to retrieve the important temporary files.

SUMMARY OF THE PRESENT INVENTION

An object of the present invention is to provide a solution to solve the problem of deleting the temporary files directly and enables the user to retrieve the important temporary files for many times to avoid irretrievable loss. The present invention is a temporary file management method for operating systems and applications which is space saving and brings good user experience.

The technical solution provided by the present invention is as below:

A temporary file management method for operating systems or applications, comprises steps of:

1) creating a to-be-deleted-next-time-content directory and one or more not-to-be-deleted-next-time-content directories beforehand; saving temporary files in the to-be-deleted-next-time-content directory or the not-to-be-deleted-next-time-content directories when the operating systems or the applications are running; calling and executing step 2) when a pre-set temporary file cleaning condition is triggered;

2) deleting files in the to-be-deleted-next-time-content directory; switching and saving files in the specified not-to-be-deleted-next-time-content directory in the to-be-deleted-next-time-content directory.

Preferably, the step 1) comprises a step to determine the to-be-deleted-next-time-content directory and the not-to-be-deleted-next-time-content directories when the operating system or the application is running, wherein the step specifically comprises steps of first determining whether the to-be-deleted-next-time-content directory exists; if not, creating the to-be-deleted-next-time-content directory; then determining whether the not-to-be-deleted-next-time-content directories exist; if a certain not-to-be-deleted-next-time-content directory does not exist, creating the not-to-be-deleted-next-time-content directory folder not to be deleted next.

Preferably, the temporary file cleaning condition to trigger in the step 1) specifically comprises an operating system startup, an operating system exit, an user login, an user logout, an application startup, an application exit, a timer trigger, a switch instruction given by an user; wherein a time difference between a timestamp of deleting a file in the to-be-deleted-next-time-content directory and a current system time reaches at least one type of specified condition.

Preferably, the temporary file is saved in a specified to-be-deleted-next-time-content directory or a specified not-to-be-deleted-next-time-content directory in the step 1) through a pre-set temporary file storage position map for the operating systems or the applications, which specifies the to-be-deleted-next-time-content directory or a certain not-to-be-deleted-next-time-content directory as a temporary file storage position for the operating systems or the applications.

Preferably, the step 2) specifically comprises steps of:

2.1A) deleting the to-be-deleted-next-time-content directory;

2.2A) renaming specified one not-to-be-deleted-next-time-content directory to the to-be-deleted-next-time-content directory; wherein the specified not-to-be-deleted-next-time-content directory is converted to a new to-be-deleted-next-time-content directory;

2.3A) creating a new not-to-be-deleted-next-time-content directory.

Preferably, there are multiple not-to-be-deleted-next-time-content directories pre-set in the step 1); the multiple not-to-be-deleted-next-time-content directories are numbered consecutively; the specified not-to-be-deleted-next-time-content directory in the step 2.2A) is a first not-to-be-deleted-next-time-content directory in a consecutively numbered directories; after the specified not-to-be-deleted-next-time-content directory is renamed to the to-be-deleted-next-time-content directory, a number of a rest not-to-be-deleted-next-time-content directory is modified to a number of a previous not-to-be-deleted-next-time-content directory respectively; a created new not-to-be-deleted-next-time-content directory in the step 2.3A) is specifically a last not-to-be-deleted-next-time-content directory in the consecutive numbered directories.

Preferably, the step 2) specifically comprises steps of:

2.1B) deleting the files in the to-be-deleted-next-time-content directory;

2.2B) moving the files in a specified not-to-be-deleted-next-time-content directory into the to-be-deleted-next-time-content directory Preferably, there are multiple not-to-be-deleted-next-time-content directories pre-set in the step 1); the multiple not-to-be-deleted-next-time-content directories are numbered consecutively; the specified not-to-be-deleted-next-time-content directory in the step 2.2B) is a first not-to-be-deleted-next-time-content directory in a consecutively numbered directories; after the files in the specified not-tobe-deleted-next-time-content directory are moved into the to-be-deleted-next-time-content directory, files in a rest not-to-be-deleted-next-time-content directory are moved into a previous not-to-be-deleted-next-time-content directory respectively.

The present invention of temporary file management method for the operating systems and applications has the below advantages: creating a to-be-deleted-next-time-content directory beforehand and at least one not-to-be-deleted-next-time-content directory; saving temporary files in the to-be-deleted-next-time-content directory or the not-to-be-deleted-next-time-content directories when the operating systems or the applications is running; deleting the files in the to-be-deleted-next-time-content directory when a pre-set temporary file cleaning condition are triggered; specifying a not-to-be-deleted-next-time-content directory; switching and saving files in the specified not-to-be-deleted-next-time-content directory in the to-be-deleted-next-time-content directory; by switching the files in the not-to-be-deleted-next-time-content directories to the to-be-deleted-next-time-content directory, the temporary files created by program abnormal exit, executive error, power off, computer crash, negligence of the programmer or other reasons (malicious software) are able to be deleted in time, which ensures a good performance while the computer is running and available storage space. The present invention is able to prevent the malicious software from occupying the temporary directory and running for a long time. The present invention has the advantages of preventing the temporary files from occupying the storage space for a long time, ensuring the operating system running with high efficiency, saving the storage space and good user experience. The temporary files are not deleted directly and the user is able to retrieve the important temporary files for many times and avoid irretrievable losses.

BRIEF DESCRIPTION OF THE DRAWINGS

FIG. 1 is a basic flow chart of embodiments of the present invention.

DETAILED DESCRIPTION OF THE PREFERRED EMBODIMENT

Embodiment 1

Referring to FIG. 1, the embodiment of temporary file management method for operating systems and applications comprises steps of:

1) creating a to-be-deleted-next-time-content directory beforehand and one or more not-to-be-deleted-next-time-content directories; saving temporary files in the to-be-deleted-next-time-content directory or the not-to-be-deleted-next-time-content directories when the operating systems or the applications are running; calling and executing step 2) when a pre-set temporary file cleaning condition is triggered. In the present embodiment, the name of the to-be-deleted-next-time-content directory is "/hdtmp/0/", there are five not-to-be-deleted-next-time-content directories, which are from "/hdtmp/1/" to "/hdtmp/5/". The number of the not-to-be-deleted-next-time-content directories is able to be other than five. For example, when there is one not-to-be-deleted-next-time-content directory, the specified consecutive not-to-be-deleted-next-time-content directory is the only not-to-be-deleted-next-time-content directory.

2) deleting the files in the to-be-deleted-next-time-content directory; specifying a not-to-be-deleted-next-time-content directory; switching and saving the files in the specified not-to-be-deleted-next-time-content directory to the to-be-deleted-next-time-content directory.

By switching the files in the not-to-be-deleted-next-time-content directories to the to-be-deleted-next-time-content directory, the temporary files created by program abnormal exit, executive error, power off, computer crash, negligence of the programmer or other reasons (malicious software) are able to be deleted in time, which ensures a good performance while the computer is running and available storage space. The embodiment is able to prevent the malicious software from occupying the temporary directory and running for a long time.

In the present embodiment, the step 1) further comprises a step to determine the to-be-deleted-next-time-content directory and the not-to-be-deleted-next-time-content directories when the operating system or the application is running, wherein the step specifically comprises steps of first determining whether the to-be-deleted-next-time-content directory exists; if not, creating the to-be-deleted-next-time-content directory;

then determining whether the not-to-be-deleted-next-time-content directories exist; if a certain not-to-be-deleted-next-time-content directory does not exist, creating the not-to-be-deleted-next-time-content directory. For example, if "/hdtmp/0/" does not exist then create "/hdtmp/0/" and if any one of the to-be-deleted-next-time-content directory from "/hdtmp/1/" to "/hdtmp/5/" does not exist then create the missing to-be-deleted-next-time-content directory.

In the present embodiment, the temporary file cleaning condition to trigger in the step 1) specifically comprises an operating system startup, an operating system exit, an user login, an user logout, an application startup, an application exit, a timer trigger, a switch instruction given by an user; wherein a time difference between a timestamp of deleting a file in the to-be-deleted-next-time-content directory and a current system time reaches at least one type of specified time. When the temporary file cleaning condition is the operating system startup, user login or application startup, the smooth switch of the directories of temporary files is ensured to a great extent, which prevents the temporary file directories switch failure caused by the operating systems or applications occupying the to-be-deleted-next-time-content directory or the not-to-be-deleted-next-time-content directories and is more reliable.

In the present embodiment, the temporary file is saved in a specified to-be-deleted-next-time-content directory or a specified not-to-be-deleted-next-time-content directory in the step 1) through a pre-set temporary file storage position map for the operating systems or the applications, which specifies the to-be-deleted-next-time-content directory or a certain not-to-be-deleted-next-time-content directory as a temporary file storage position for the operating systems or the applications. To find a directory position to save the temporary files of the operating systems or the applications from the to-be-deleted-next-time-content directory or the not-to-be-deleted-next-time-content directories by setting the temporary file storage position map enables the operating systems and applications to define the temporary files storage position more flexibly and conveniently.

In the present embodiment, the step 2) specifically comprises steps of:

2.1A) deleting the to-be-deleted-next-time-content directory ("/hdtmp/0/");

2.2A) specifying and renaming one not-to-be-deleted-next-time-content directory to the to-be-deleted-next-time-content directory; wherein the specified not-to-be-deletednext-time-content directory is converted to a new to-be-deleted-next-time-content directory ("/hdtmp/0/");

2.3A) creating a new not-to-be-deleted-next-time-content directory.

In the present embodiment, a timestamp set when creates a new not-to-be-deleted-next-time-content directory is the timestamp when the files in the to-be-deleted-next-time-content directory are deleted. The timestamp is able to be saved in the files under the directory, in the attributes of the directories, in the extended attributes of the directories or in the database.

Conventionally, the temporary files of the application are saved in a specified directory. Some important temporary files may get lost if the temporary files are deleted directly, which may cause irretrievable loss. If the temporary files are not deleted, the temporary files may occupy the storage space unnecessarily, cause computer resource waste and slow down the operating system. In the embodiment, there are multiple not-to-be-deleted-next-time-content directories pre-set in the step 1); the multiple not-to-be-deleted-next-time-content directories is numbered consecutively ("/hdtmp/1/" to "/hdtmp/5/"); the specified not-to-be-deleted-next-time-content directory in the step 2.2A) is a first not-to-be-deleted-next-time-content directory ("/hdtmp/1/") in a consecutively numbered directories; after the specified not-to-be-deleted-next-time-content directory is renamed to the to-be-deleted-next-time-content directory, a number of a rest not-to-be-deleted-next-time-content directory is modified to a number of a previous not-to-be-deleted-next-time-content directory respectively, wherein "/hdtmp/2/" is modified to "/hdtmp/1/"; "/hdtmp/3/" is modified to "/hdtmp/2/"; "/hdtmp/4/" is modified to "/hdtmp/3/"; "/hdtmp/5/" is modified to "/hdtmp/4/". A created new not-to-be-deleted-next-time-content directory in the step 2.3A) is specifically a last not-to-be-deleted-next-time-content directory in the consecutive numbered directories ("/hdtmp/5/"). The above rules ensure the simplicity and clarity of the storage rules for the temporary file directory corresponding to each application without extra directory map. For example, the temporary files of the application is saved in "/hdtmp/3/"; the temporary files of the application are saved in "/hdtmp/2/" and the application read the temporary files from "/hdtmp/2/" automatically after the temporary files cleaning condition is triggered and a switch of the temporary file directory is completed. On one hand, the temporary files of the application are not deleted directly, which move from the "/hdtmp/5/" to "/hdtmp/1/" in sequence. The user has multiple chances (five in the embodiment) to retrieve important temporary files, which prevents the irretrievable loss from happening; on the other hand, the temporary files are deleted after multiple moves from "/hdtmp/5/" to "/hdtmp/1/", which prevents the temporary files from occupying the storage space unnecessarily, reduces the computer resource waste and ensures the operating system to run with high efficiency.

Embodiment 2

The embodiment 2 is similar to the embodiment 1 but is different in: (1) the name of the to-be-deleted-next-time-content directory is "/temp/" and the number of the not-to-be-deleted-next-time-content directory is one and the name of the not-to-be-deleted-next-time-content directory is "/tempbak/"; (2) the step (2) is different from the step (2) in the embodiment 1; wherein the files saved in the to-be-deleted-next-time-content directory ("/temp/") are deleted while the directory of the to-be-deleted-next-time-content directory ("/temp/") is remained.

In the embodiment 2, the step 2) specifically comprises steps of:

2.1B) deleting the files in the to-be-deleted-next-time-content directory ("/temp/");

2.2B) moving the files in a specified not-to-be-deleted-next-time-content directory into the to-be-deleted-next-time-content directory ("/temp/").

In the present embodiment, a timestamp set when creates a new not-to-be-deleted-next-time-content directory is the timestamp when the files in the to-be-deleted-next-time-content directory are deleted. The timestamp is able to be saved in the files under the directory, in the attributes of the directory, in the extended attributes of the directory or in the database.

Similar to the embodiment 1, in the present invention, there are multiple not-to-be-deleted-next-time-content directories pre-set in the step 1); the multiple not-to-be-deleted-next-time-content directories are numbered consecutively; the specified not-to-be-deleted-next-time-content directory in the step 2.2B) is a first not-to-be-deleted-next-time-content directory ("/tempbak/") in a consecutively numbered directories. In the embodiment, the number of the not-to-be-deleted-next-time-content directory is one, wherein the files in the consecutive not-to-be-deleted-next-time-content directory are not moved to the previous not-to-be-deleted-next-time-content directory after the files in the specified not-to-be-deleted-next-time-content directory ("/tempbak/") are moved to the to-be-deleted-next-time-content directory ("/temp/"). When there are multiple not-to-be-deleted-next-time-content directories, the files in the consecutive not-to-be-deleted-next-time-content directories are moved to a previous not-to-be-deleted-next-time-content directory in sequence after the files in the specified not-to-be-deleted-next-time-content directory ("/tempbak/") are moved to the to-be-deleted-next-time-content directory ("/temp/"). The above rules ensure the simplicity and clarity of the storage rules for the temporary file directory corresponding to each application without extra directory map. On one hand, the temporary files of the application are not deleted directly, which move among the not-to-be-deleted-next-time-content directories in sequence. The temporary files are deleted after finally being moved to the to-be-deleted-next-time-content directory. The user has a chance to retrieve important temporary files, which prevents the irretrievable loss from happening; on the other hand, the temporary files are deleted in the to-be-deleted-next-time-content directory after multiple moves among the not-to-be-deleted-next-time-content directories, which prevents the temporary files from occupying the storage space unnecessarily, reduces the computer resource waste and ensures the operating system to run with high efficiency.

The embodiments are just optimal illustration of the present invention but not a limitation for the present invention. All the technical solutions in the spirit of the present invention are within the protection range of the present invention. For a skilled technician in the field, the modifications and improvements without innovative efforts and adopting the theory of the present invention are within the protection range of the present invention.

What is claimed is:

1. A temporary file management method for operating systems or applications, comprising steps of:
1) creating a to-be-deleted-next-time-content directory beforehand and one or more not-to-be-deleted-next-time-content directories; saving temporary files in the to-be-deleted-next-time-content directory or the not-to-be-deleted-next-time-content directories when the operating systems or the applications are running; calling and executing step 2) when a pre-set temporary file cleaning condition is triggered; and 2) deleting files in the to-be-deleted-next-time-content directory; specifying a not-to-be-deleted-next-time-content directory; switching files to and saving files in the to-be-deleted-next-time-content directory from the specified not-to-be-delete d-next-time-content directory.

2. The temporary file management method, as recited in claim 1, wherein the step 1) further comprises a step to determine the to-be-deleted-next-time-content directory and the not-to-be-deleted-next-time-content directories when the operating system or the application is running, wherein the step specifically comprises steps of first determining whether the to-be-deleted-next-time-content directory exists; if not, creating the to-be-deleted-next-time-content directory; then determining whether the not-to-be-deleted-next-time-content directories exists; if a certain not-to-be-deleted-next-time-content directory does not exist, creating the not-to-be-deleted-next-time-content directories.

3. The temporary file management method, as recited in claim 2, wherein the temporary file cleaning condition to trigger in the step 1) specifically comprises an operating system startup, an operating system exit, an user login, an user logout, an application startup, an application exit, a timer trigger, a switch instruction given by an user; wherein a time difference between a timestamp of deleting a file in the to-be-deleted-next-time-content directory and a current system time reaches at least one type of specified time.

4. The temporary file management method, as recited in claim 3, wherein the temporary file is saved in a specified to-be-deleted-next-time-content directory or a specified not-to-be-deleted-next-time-content directory in the step 1) through a pre-set temporary file storage position map for the operating systems or the applications, which specifies the to-be-deleted-next-time-content directory or a certain not-to-be-deleted-next-time-content directory as a temporary file storage position for the operating systems or the applications.

5. The temporary file management method, as recited in claims 1, wherein the step 2) specifically comprises steps of:
   2.1A) deleting the to-be-deleted-next-time-content directory;
   2.2A) specifying and renaming one not-to-be-deleted-next-time-content directory to the to-be-deleted-next-time-content directory; wherein the specified not-to-be-deleted-next-time-content directory is converted to a new to-be-deleted-next-time-content directory; and
   2.3A) creating a new not-to-be-deleted-next-time-content directory.

6. The temporary file management method, as recited in claim 2, wherein the step 2) specifically comprises steps of:
   2.1A) deleting the to-be-deleted-next-time-content directory;
   2.2A) specifying and renaming one not-to-be-deleted-next-time-content directory to the to-be-deleted-next-time-content directory; wherein the specified not-to-be-deleted-next-time-content directory is converted to a new to-be-deleted-next-time-content directory; and
   2.3A) creating a new not-to-be-deleted-next-time-content directory.

7. The temporary file management method, as recited in claim 3, wherein the step 2) specifically comprises steps of:
   2.1A) deleting the to-be-deleted-next-time-content directory;
   2.2A) specifying and renaming one not-to-be-deleted-next-time-content directory to the to-be-deleted-next-time-content directory; wherein the specified not-to-be-deleted-next-time-content directory is converted to a new to-be-deleted-next-time-content directory; and
   2.3A) creating a new not-to-be-deleted-next-time-content directory.

8. The temporary file management method, as recited in claim 4, wherein the step 2) specifically comprises steps of:
   2.1A) deleting the to-be-deleted-next-time-content directory;
   2.2A) specifying and renaming one not-to-be-deleted-next-time-content directory to the to-be-deleted-next-time-content directory; wherein the specified not-to-be-deleted-next-time-content directory is converted to a new to-be-deleted-next-time-content directory; and
   2.3A) creating a new not-to-be-deleted-next-time-content directory.

9. The temporary file management method, as recited in claim 5, wherein there are multiple not-to-be-deleted-next-time-content directories pre-set in the step 1); the multiple not-to-be-deleted-next-time-content directories is numbered consecutively; a specified not-to-be-deleted-next-time-content directory in the step 2.2A) is a first not-to-be-deleted-next-time-content directory in a consecutively numbered directories; after the specified not-to-be-deleted-next-time-content directory is renamed to the to-be-deleted-next-time-content directory, a number of rest not-to-be-deleted-next-time-content directories is modified to a number of a previous not-to-be-deleted-next-time-content directory respectively; a created new not-to-be-deleted-next-time-content directory in the step 2.3A) is specifically a last not-to-be-deleted-next-time-content directory in the consecutive numbered directories.

10. The temporary file management method, as recited in claim 6, wherein there are multiple not-to-be-deleted-next-time-content directories pre-set in the step 1); the multiple not-to-be-deleted-next-time-content directories is numbered consecutively; a specified not-to-be-deleted-next-time-content directory in the step 2.2A) is a first not-to-be-deleted-next-time-content directory in a consecutively numbered directories; after the specified not-to-be-deleted-next-time-content directory is renamed to the to-be-deleted-next-time-content directory, a number of rest not-to-be-deleted-next-time-content directories is modified to a number of a previous not-to-be-deleted-next-time-content directory respectively; a created new not-to-be-deleted-next-time-content directory in the step 2.3A) is specifically a last not-to-be-deleted-next-time-content directory in the consecutive numbered directories.

11. The temporary file management method, as recited in claim 7, wherein there are multiple not-to-be-deleted-next-time-content directories pre-set in the step 1); the multiple not-to-be-deleted-next-time-content directories is numbered consecutively; a specified not-to-be-deleted-next-time-content directory in the step 2.2A) is a first not-to-be-deleted-next-time-content directory in a consecutively numbered directories; after the specified not-to-be-deleted-next-time-content directory is renamed to the to-be-deleted-next-time-content directory, a number of rest not-to-be-deleted-next-time-content directories is modified to a number of a previous not-to-be-deleted-next-time-content directory respectively; a created new not-to-be-deleted-next-time-content directory in the step 2.3A) is specifically a last not-to-be-deleted-next-time-content directory in the consecutive numbered directories.

12. The temporary file management method, as recited in claim 8, wherein there are multiple not-to-be-deleted-next-time-content directories pre-set in the step 1); the multiple not-to-be-deleted-next-time-content directories is numbered consecutively; a specified not-to-be-deleted-next-time-content directory in the step 2.2A) is a first not-to-be-deleted-next-time-content directory in a consecutively numbered directories; after the specified not-to-be-deleted-next-time-content directory is renamed to the to-be-deleted-next-time-content directory, a number of rest not-to-be-deleted-next-time-content directories is modified to a number of a previous not-to-be-deleted-next-time-content directory respectively; a created new not-to-be-deleted-next-time-content directory in the step 2.3A) is specifically a last not-to-be-deleted-next-time-content directory in the consecutive numbered directories.

13. The temporary file management method, as recited in claim 1, wherein the step 2) specifically comprises steps of:
2.1B) deleting the files in the to-be-deleted-next-time-content directory; and
2.2B) moving the files in a specified not-to-be-deleted-next-time-content directory into the to-be-deleted-next-time-content directory.

14. The temporary file management method, as recited in claim 2, wherein the step 2) specifically comprises steps of:
2.1B) deleting the files in the to-be-deleted-next-time-content directory; and
2.2B) moving the files in a specified not-to-be-deleted-next-time-content directory into the to-be-deleted-next-time-content directory.

15. The temporary file management method, as recited in claim 3, wherein the step 2) specifically comprises steps of:
2.1B) deleting the files in the to-be-deleted-next-time-content directory; and
2.2B) moving the files in a specified not-to-be-deleted-next-time-content directory into the to-be-deleted-next-time-content directory.

16. The temporary file management method, as recited in claim 4, wherein the step 2) specifically comprises steps of:
2.1B) deleting the files in the to-be-deleted-next-time-content directory; and
2.2B) moving the files in a specified not-to-be-deleted-next-time-content directory into the to-be-deleted-next-time-content directory.

17. The temporary file management method, as recited in claim 13, wherein there are multiple not-to-be-deleted-next-time-content directories pre-set in the step 1); the multiple not-to-be-deleted-next-time-content directories is numbered consecutively; the specified not-to-be-deleted-next-time-content directory in the step 2.2B) is a first not-to-be-deleted-next-time-content directory in a consecutively numbered directories; after the files in the specified not-to-be-deleted-next-time-content directory are moved into the to-be-deleted-next-time-content directory, files in rest not-to-be-deleted-next-time-content directories are moved into a previous not-to-be-deleted-next-time-content directory respectively.

18. The temporary file management method, as recited in claim 14, wherein there are multiple not-to-be-deleted-next-time-content directories pre-set in the step 1); the multiple not-to-be-deleted-next-time-content directories is numbered consecutively; the specified not-to-be-deleted-next-time-content directory in the step 2.2B) is a first not-to-be-deleted-next-time-content directory in a consecutively numbered directories; after the files in the specified not-to-be-deleted-next-time-content directory are moved into the to-be-deleted-next-time-content directory, files in rest not-to-be-deleted-next-time-content directories are moved into a previous not-to-be-deleted-next-time-content directory respectively.

19. The temporary file management method, as recited in claim 15, wherein there are multiple not-to-be-deleted-next-time-content directories pre-set in the step 1); the multiple not-to-be-deleted-next-time-content directories is numbered consecutively; the specified not-to-be-deleted-next-time-content directory in the step 2.2B) is a first not-to-be-deleted-next-time-content directory in a consecutively numbered directories; after the files in the specified not-to-be-deleted-next-time-content directory are moved into the to-be-deleted-next-time-content directory, files in rest not-to-be-deleted-next-time-content directories are moved into a previous not-to-be-deleted-next-time-content directory respectively.

20. The temporary file management method, as recited in claim 16, wherein there are multiple not-to-be-deleted-next-time-content directories pre-set in the step 1); the multiple not-to-be-deleted-next-time-content directories is numbered consecutively; the specified not-to-be-deleted-next-time-content directory in the step 2.2B) is a first not-to-be-deleted-next-time-content directory in a consecutively numbered directories; after the files in the specified not-to-be-deleted-next-time-content directory are moved into the to-be-deleted-next-time-content directory, files in rest not-to-be-deleted-next-time-content directories are moved into a previous not-to-be-deleted-next-time-content directory respectively.

* * * * *